Feb. 7, 1939.  E. C. HORTON  2,146,395
MOTOR VEHICLE ACCESSORY SYSTEM
Filed Dec. 29, 1936
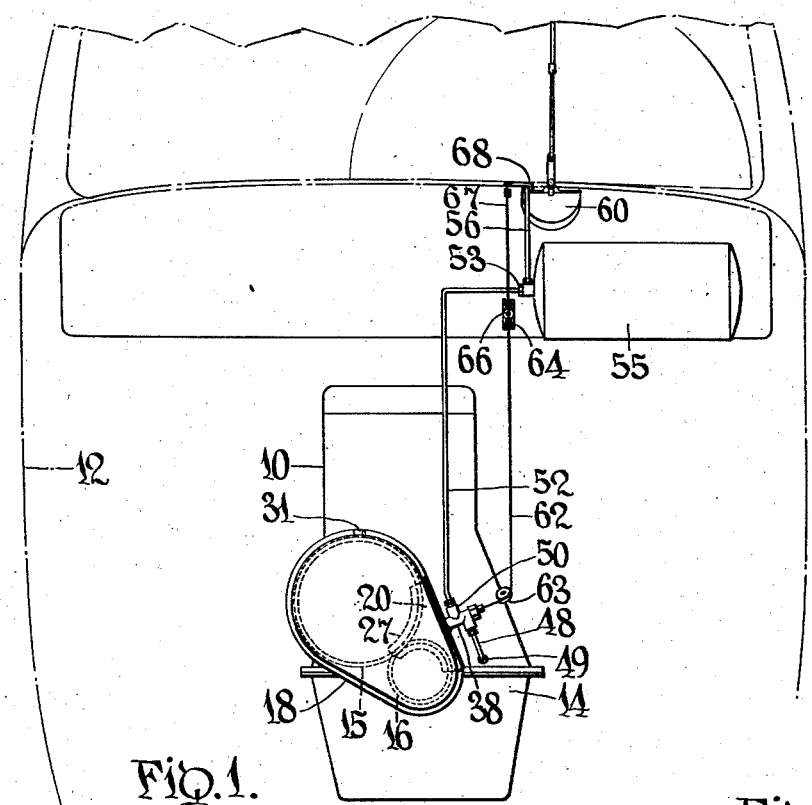
Fig.1.
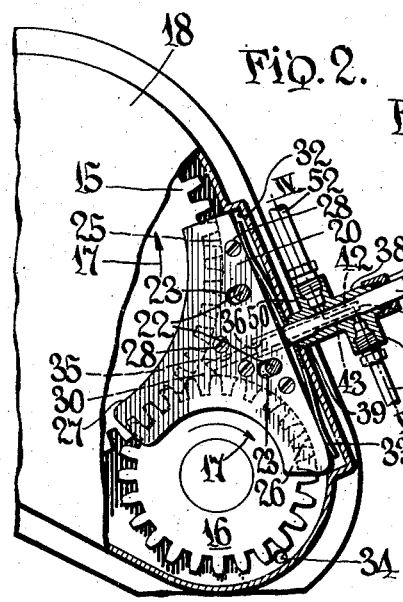
Fig.2.
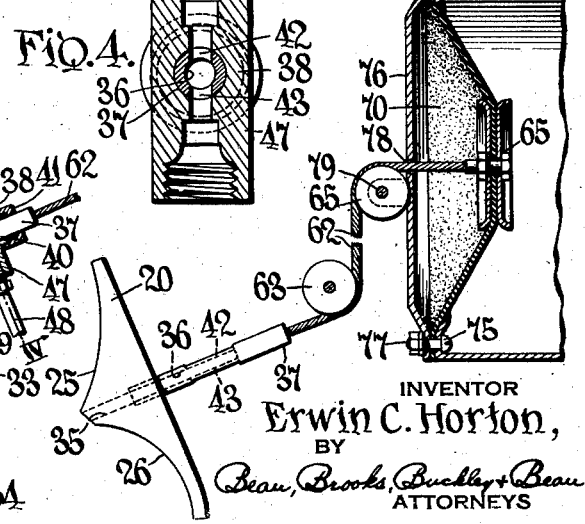
Fig.3.
Fig.4.
INVENTOR
Erwin C. Horton,
BY
Beau, Brooks, Buckley & Beau.
ATTORNEYS Patented Feb. 7, 1939

2,146,395

UNITED STATES PATENT OFFICE 2,146,395

MOTOR VEHICLE ACCESSORY SYSTEM

Erwin C. Horton, Hamburg, N. Y., assignor to Trico Products Corporation, Buffalo, N. Y.

Application December 29, 1936, Serial No. 118,069

9 Claims. (Cl. 60—60)

This invention relates to suction producing mechanism for differential pressure operated devices and it has particular relation to a coacting vacuum control and lubricating mechanism.

One object of the invention is to provide an improved accessory control system for suction or vacuum producing and operating devices.

Another object of the invention is to provide an improved lubricating and suction producing mechanism adapted for use in operating fluid pressure operated devices.

The invention is incorporated in a motor vehicle and is adapted to be included with transmission gears of an internal combustion engine. At the side of engaging gears where the gear teeth separate in diverging directions, the progressive separation of the gear teeth creates an area of sub-atmospheric pressure or partial vacuum. The efficiency of the vacuum producing area is improved by enclosing the gears in a casing and providing a confined space at the vacuum producing area. To this end, a member having walls corresponding substantially in curvature to the peripheral curvature of the gears is mounted in movable relation to and from the vacuum producing area and into substantially sliding contact with the gears. Suitable side pieces are provided on the member to insure proper confinement of the vacuum producing space and the member is gauged so as to prevent its pressure against the gears. Conduits communicate with the vacuum producing space and with a supply of lubricant, such as an engine crank case, and with a pressure operated device.

The movable member is controlled in such manner, either manually or automatically, that the vacuum space is opened or closed so as to intensify or dissipate the partial vacuum, and during operation of the mechanism the suction produced may draw lubricant from a source of supply into the gear casing to insure proper lubricant seal and bath for the gears. The gear casing communicates with the crank case in such manner that the lubricant can be returned thereto.

In the drawing:

Fig. 1 is a diagrammatic rear elevation of suction operated and suction producing elements included in a motor vehicle;

Fig. 2 is a fragmentary elevation, on a larger scale, of transmission gearing and supports therefor, and wherein portions of the structure are shown in vertical section;

Fig. 3 is a fragmentary vertical section, on a larger scale, of an alternative form of suction control mechanism; and Fig. 4 is a cross section, on a larger scale, taken substantially along the line IV—IV of Fig. 2.

Referring to Fig. 1, a conventional internal combustion engine 10 that is carried in a vehicle body 12 is provided with a crank case 14 and transmission gears 15 and 16 rotatably driven in the direction indicated by arrows 17 (Fig. 2). A gear casing 18 encloses the gears and a suction control block 20 is mounted slidably upon supports 22 that are rigidly secured in the casing 18 and that are disposed through slots 23 formed through the block. Converging walls 25 and 26 formed upon the inner side of the block 20 correspond in curvatures to the outer circumferential curvatures of the gears 15 and 16, respectively.

A plate or apron 27 is secured, as indicated at 28, upon each side of the block 20 and overlaps the gears to cover the area of engagement of the teeth and the area of the contiguous relation of the gears to the block. A suction or subatmospheric pressure chamber 30 is thus formed between the plates 27 and at the location of the separation of the teeth of the two gears during their rotation.

The outer side of the block 20 is disposed in a recess 32 formed in the outer wall of the gear casing 18, and a leaf spring 33, bent into suitable arcuate or sinuous form, is disposed under compression between the block and the adjacent inner wall surface of the gear casing. This spring constantly urges the block toward the gears in the position indicated in Fig. 2.

A suitable air vent 31 is formed in the upper wall of the gear casing 18 and an opening 34 communicates from the gear casing 18 into the crank case 14.

A control duct 35 communicating with the suction chamber 30 is formed in the block and communicates with a duct 36 formed in a tubular stem 37 that is rigidly secured in the outer side of the block. A stationary sleeve 38 rigidly secured, as indicated at 39, in the wall of the gear casing slidably receives the stem 37 axially therein. The duct 36 does not extend axially entirely through the stem 37, but terminates at the location indicated at 40. A suitable packing cap 41 is secured in fluid tight relation around the outer portion of the stem and upon the outer end of the sleeve 38.

An intermediate portion of the stem 37 is provided with slots or openings 42 and 43 (Fig. 4) that communicate directly with the duct 36.

A hollow boss 47 communicating with the slot 43 has one end of a conduit 48 secured therein, and the other end of the conduit is connected, as indicated at 49, to the oil containing crank case of the engine 10 to supply oil to the gear casing. A second hollow boss 50 has one end of a conduit 52 secured therein for communication through the slot 42 and duct 36 with the chamber 30, and the other end of the latter conduit is connected, as indicated at 53, to a vacuum storage tank 55 suitably carried in the vehicle frame. A conduit 56 also communicates from the vacuum tank to a fluid pressure operated device 60, such as the windshield cleaner, illustrated in Patent No. 1,840,233, granted to Henry Hueber January 5, 1932.

It will be apparent that the chamber 30 communicates with both the vacuum tank 35 and with the engine crank case through the conduits 52 and 48, respectively, as well as through the slotted stem 37.

A flexible member 62 is connected to the outer end of the stem 37 and is trained over pulleys 63 and 64 connected to the engine and to a handle 66 carried on the vehicle body, respectively. By actuating the handle 66, this flexible member can be manually operated to slide the stem 37 outwardly against the resistance of the spring 33, but not restricting communication from the ducts 35 and 36 to the chamber 30.

The operation of the gears 15—16 in the direction of the arrows (Fig. 2) produces a partial vacuum in the chamber 30 which is in communication with the vacuum tank 55 and through the tank, with the device 60 to operate the latter. Since the conduit 48 communicates with the engine crank case and the chamber 30, the suction action of the partial vacuum in the conduits, draws a limited supply of lubricant from the crank case into the chamber 30, and hence, provides proper lubrication and fluid sealing of the gears in the gear casing 18.

In the event the vacuum created becomes excessive, the flexible member 62 can be manually operated to draw the block 20 away from the teeth of the gears for the purpose of at least partially dissipating the vacuum in the chamber 30. Likewise, in this manner of operation, the pressure device 60 can be deenergized and also the effect or drag action upon the gears 15—16, tending to retard the latter as a result of the subatmospheric pressure in the chamber 30, can be relieved.

The flexible member 62 can be so operated manually as not to dissipate entirely the subatmospheric pressure in the chamber 30, and thus, sufficient suction energy is retained to operate the windshield wiper to a parked position in the device 60 of the type shown in the patent referred to above. A suitable actuating member 67 extends from the manual control 66 to a parking control member 68 on the device 60 for operating the latter concurrently with the operation of the flexible member 62. Therefore, the partially dissipated sub-atmospheric pressure in the chamber 30 can be utilized to maintain the windshield wiper in parked position, and at the same time the drag action on the gears is reduced to such extent as to be of no material consequence.

In the form of the invention shown in Fig. 3, the block 20 and stem 37 are constructed for arrangement with the gears 15—16 in the same manner as that shown in Figs. 1 and 2. However, the flexible member 37 is connected, as indicated at 65, to a central portion of a diaphragm 70 that constitutes an impervious end wall of a vacuum tank 72 which can be substituted for the vacuum tank 55. A suitable boss 73 is provided on the tank for connection of the conduit 56 between the tank and device 60. The outer circumferential edge of the diaphragm is clamped between flanges 75 formed on the vacuum tank 72 and on a head 76 for covering and protecting the diaphragm. Suitable fastening devices such as bolts 77 provide proper clamping action between these flanges to secure the diaphragm. An opening 78 formed centrally in the head 76 slidably receives the flexible member 62. If desirable a pulley 65 similar to the pulley 64 and for like purposes, instead of being connected directly to the vehicle frame, can be connected, as indicated at 79, to the head 76 of the vacuum tank.

The diaphragm 70 can be composed of flexible or resilient material and gauged according to the resistance it has to offer. As the vacuum becomes more pronounced in the chamber 30, or as the atmosphere in the tank becomes more rarefied, the atmospheric pressure on the outside of the diaphragm actuates the flexible member 62 and draws the block 20 away from the surfaces of the gears. Thus the vacuum is dissipated, or partially dissipated. If vacuum is created in the chamber 30 beyond a predetermined degree of rarefication of atmosphere therein, the gears become noisy, and the diaphragm 70 is so arranged, as to responsiveness to pressure, and relation to the resistance offered by the spring 33, that the vacuum is controlled to assume a substantially uniform and predetermined value that will prevent the gear noise, and at the same time insure a suitable vacuum or sub-atmospheric pressure source. The accessory 60 energized from the source of sub-atmospheric pressure described is thus operated at a uniform speed by virtue of the substantially constant pressure achieved by the automatic control.

It is to be understood that the control of the vacuum chamber 30 can be effected either manually by operating the handle 66, or automatically by employing the diaphragm.

Although only two forms of the invention have been shown and described in detail, it will be apparent to those skilled in the art that the invention is not so limited, but that various changes can be made therein without departing from the spirit of the invention or from the scope of the appended claims.

I claim:

1. The combination with a pair of driven intermeshing gears, of a device partially surrounding the engaging region of the gears to form a subatmospheric pressure chamber substantially enclosed by the gears and device and movable in a direction transversely of the line joining the axes of rotation of the gears, a conduit communicating with the chamber and with a source of lubricant, and means for actuating said device away from the gears, whereby the subatmospheric pressure in the chamber is at least partially dissipated.

2. The combination with a pair of driven intermeshing gears, of a member movable toward and away from the engaging region of the intermeshing gears and in a direction transversely of the line joining the axes of rotation of the gears to form a subatmospheric pressure chamber substantially enclosed by the gears and member, a conduit communicating through said member with the chamber and with a source of lubricant, and means for actuating the movable member away from the gears, whereby subatmospheric pressure in the chamber is at least partially dissipated.

3. The combination with a pair of driven intermeshing gears, of a member movable toward and away from the engaging region of the gears and in a direction transversely of the line joining the axes of rotation of the gears to form a subatmospheric pressure chamber substantially enclosed by the gears and the member, yieldable means normally urging said member toward the gears, a conduit communicating with the chamber and with a source of lubricant responsive to suction action in the chamber to supply lubricant to the gears, and means for actuating the movable member in opposition to the yieldable means, whereby the subatmospheric pressure in the chamber is at least partially dissipated.

4. The combination with a pair of driven intermeshing gears, of a device partially surrounding the engaging region of the gears to form a subatmospheric pressure chamber substantially enclosed by said gears and device and movable in a direction transversely of the line joining the axes of rotation of the gears, a vacuum tank having a conduit connected thereto and to said chamber, a conduit communicating with the chamber and with a source of lubricant, and means for actuating said device away from the gears, whereby the subatmospheric pressure in the chamber is at least partially dissipated.

5. The combination with a pair of driven intermeshing gears, of a device partially surrounding the engaging region of the gears to form a subatmospheric pressure chamber substantially enclosed by said gears and device and movable in a direction transversely of the line joining the axes of rotation of the gears, a vacuum tank having a conduit connected thereto and to said chamber, a conduit communicating with the chamber and with a source of lubricant, means incorporated with said tank and responsive to predetermined pressure therein for actuating said device away from the gears whereby the subatmospheric pressure in the chamber is at least partially dissipated, and a connection between said means and device.

6. The combination with a pair of driven intermeshing gears, of a device partially surrounding the engaging region of the gears to form a subatmospheric pressure chamber substantially enclosed by said gears and device and movable in a direction transversely of the line joining the axes of rotation of the gears, a vacuum tank having a conduit connected thereto and to said chamber, a conduit communicating with the chamber and with a source of lubricant, yieldable means normally urging said device toward the gears, mechanism incorporated with said tank and responsive to predetermined pressure therein for actuating said device away from the gears in opposition to said yieldable means whereby the subatmospheric pressure in the chamber is at least partially dissipated, and a connection between said mechanism and device.

7. In combination with a pair of intermeshing gears forming a part of a motor vehicle power plant, pump converting means associated with the gears for forming an air pump therewith, an air actuated accessory operatively connected to the air pump, means mounting the converting means for movement to and from an operative association with the gears whereby said converting means may be inoperatively disposed to relieve the gears from pump functioning when the accessory is not in use, and means for moving said converting means out of operative relation to said gears.

8. In a motor vehicle having a power plant, a fluid pressure actuated accessory, means connected to the accessory and cooperating with operating parts of the power plant for producing an operating supply of fluid pressure to the accessory, said means producing a changeable degree of fluid pressure upon movement thereof relative to said operating parts, means mounting said first means for such movement, and means responsive to the pressure produced by said first means for moving the latter to maintain a substantially uniform generated pressure.

9. The combination with a pair of driven intermeshing gears, of a device partially surrounding the engaging region of the gears to form a subatmospheric pressure chamber substantially enclosed by the gears and device, a hollow stem mounted in said device and communicating with said chamber, means slidably supporting said stem and device to provide movement of said device toward and away from said gears in a direction transversely of the line joining the axes of rotation of the gears, said means and stem being formed with openings communicating with said chamber, a conduit communicating with said openings and with a source of lubricant, and means for actuating said device away from the gears, whereby the subatmospheric pressure in said chamber is at least partially dissipated.

ERWIN C. HORTON.